(12) United States Patent
Bernicot et al.

(10) Patent No.: US 11,476,747 B2
(45) Date of Patent: Oct. 18, 2022

(54) ELECTROMAGNETIC RETARDER AND GENERATOR ASSEMBLY WITH ROTOR AND STATOR, AND VEHICLE COMPRISING SUCH AN ASSEMBLY

(71) Applicant: TELMA, Saint Ouen l'Aumône (FR)

(72) Inventors: Marie-Pierre Bernicot, Poissy (FR); Mbarek Akafou, Les Mureaux (FR); Rafik Lounis, Cergy (FR); Nicolas Quennet, Cormeilles en Parisis (FR)

(73) Assignee: TELMA, Saint Ouen l'Aumone (FR)

( * ) Notice: Subject to any disclaimer, the term of this patent is extended or adjusted under 35 U.S.C. 154(b) by 524 days.

(21) Appl. No.: 16/455,853

(22) Filed: Jun. 28, 2019

(65) Prior Publication Data
US 2020/0007019 A1    Jan. 2, 2020

(30) Foreign Application Priority Data

Jun. 28, 2018 (FR) ...................... 18 55848

(51) Int. Cl.
*H02K 49/04* (2006.01)
*H02K 7/20* (2006.01)

(52) U.S. Cl.
CPC ............... *H02K 49/04* (2013.01); *H02K 7/20* (2013.01)

(58) Field of Classification Search
CPC .......... H02K 49/04; H02K 11/33; H02K 7/10; H02K 7/20; H02K 7/104; H02K 7/106; H02K 7/112; H02K 7/1125; H02K 7/1023; F16C 32/0497
USPC ................................. 310/266, 105
See application file for complete search history.

(56) References Cited

U.S. PATENT DOCUMENTS

| | | | | |
|---|---|---|---|---|
| 4,179,635 A | * | 12/1979 | Beermann .............. | H02K 3/487 310/214 |
| 4,274,027 A | * | 6/1981 | Higuchi .................. | H02K 1/24 310/262 |
| 4,379,243 A | * | 4/1983 | Dailey ................... | H02K 3/505 310/260 |
| 4,385,725 A | * | 5/1983 | Pischlinger ............. | F02G 5/00 122/26 |

(Continued)

FOREIGN PATENT DOCUMENTS

| | | |
|---|---|---|
| CN | 103683803 A | 3/2014 |
| CN | 104753310 A | 7/2015 |

(Continued)

OTHER PUBLICATIONS

FR Search Report, dated Mar. 11, 2019, from corresponding FR application No. 1855848.

(Continued)

*Primary Examiner* — Maged M Almawri
(74) *Attorney, Agent, or Firm* — Nixon & Vanderhye (57) ABSTRACT

Disclosed is an electromagnetic retarder and generator assembly, the assembly including a rotor, a retarder armature carried by the rotor, a generator inductor carried by the rotor, a stator including a sleeve having one outer axial surface and one inner axial surface, a retarder inductor arranged on the outer axial surface of the stator and a generator armature arranged on the inner axial surface of the stator. The sleeve includes several bodies of nonmagnetic material arranged between the inductor of the retarder and the armature of the generator.

24 Claims, 5 Drawing Sheets

(56) References Cited

U.S. PATENT DOCUMENTS

| | | | | |
|---|---|---|---|---|
| 4,585,085 A * | 4/1986 | Handel | B60K 6/48 | 318/254.1 |
| 4,627,525 A * | 12/1986 | Geldec | F16D 27/112 | 192/30 W |
| 4,893,040 A * | 1/1990 | Turner | H02K 1/276 | 310/262 |
| 5,053,632 A * | 10/1991 | Suzuki | B60L 50/40 | 903/906 |
| 5,279,262 A * | 1/1994 | Muehleck | F22B 3/06 | 122/26 |
| 5,289,905 A * | 3/1994 | Braschler | F16D 65/04 | 188/296 |
| 5,437,090 A * | 8/1995 | Sakane | H02K 1/243 | 310/263 |
| 5,485,050 A * | 1/1996 | Zimmermann | H02K 3/505 | 310/260 |
| 5,613,472 A * | 3/1997 | Edelmann | F16D 65/78 | 123/195 A |
| 5,942,826 A * | 8/1999 | Even | H02K 49/046 | 310/105 |
| 5,986,370 A * | 11/1999 | Cheng | H02K 49/043 | 188/164 |
| 6,040,634 A * | 3/2000 | Larguier | B60K 6/485 | 290/46 |
| 6,176,355 B1 * | 1/2001 | Yamamoto | H02K 49/043 | 188/161 |
| 6,232,681 B1 * | 5/2001 | Johnston | H02K 1/12 | 310/179 |
| 6,346,752 B1 * | 2/2002 | Osada | H02K 49/043 | 310/43 |
| 6,362,544 B2 * | 3/2002 | Johnston | H02K 3/04 | 310/179 |
| 6,543,588 B1 * | 4/2003 | Raad | B60T 13/662 | 318/4 |
| 6,578,681 B1 * | 6/2003 | Raad | B60T 10/02 | 188/161 |
| 6,700,242 B2 * | 3/2004 | Kawamura | H02K 21/48 | 310/191 |
| 6,756,870 B2 * | 6/2004 | Kuwahara | H01F 7/06 | 310/105 |
| 6,820,728 B2 * | 11/2004 | Raad | B60T 1/062 | 188/161 |
| 6,927,524 B2 * | 8/2005 | Pyntikov | H02K 1/187 | 318/293 |
| 6,998,757 B2 * | 2/2006 | Seguchi | H02K 21/029 | 310/68 B |
| 7,178,644 B2 * | 2/2007 | Kloft | H02K 9/19 | 188/161 |
| 7,626,299 B2 * | 12/2009 | Yoshikawa | H02K 21/12 | 310/112 |
| 7,888,839 B2 * | 2/2011 | Gabrys | H02K 21/24 | 310/140 |
| 8,283,829 B2 * | 10/2012 | Yamamoto | H02K 1/2793 | 310/156.55 |
| 8,646,550 B2 * | 2/2014 | Penev | B60L 8/006 | 180/2.2 |
| 8,754,568 B2 * | 6/2014 | Kim | H02K 16/02 | 310/254.1 |
| 9,083,222 B2 * | 7/2015 | Li | H02K 1/20 | |
| 9,178,404 B2 * | 11/2015 | Li | H02K 21/12 | |
| 10,066,685 B2 * | 9/2018 | Sannelius | B60T 1/087 | |
| 10,312,780 B2 * | 6/2019 | Guo | H02K 1/246 | |
| 10,367,398 B2 * | 7/2019 | Tojima | H02K 19/103 | |
| 10,554,082 B2 * | 2/2020 | Watanabe | H02K 1/14 | |
| 10,625,620 B1 * | 4/2020 | Plow | B60K 25/02 | |
| 10,715,017 B2 * | 7/2020 | Gieras | H02K 1/2746 | |
| 10,828,990 B2 * | 11/2020 | Carballo Rodriguez | B61H 11/04 | |
| 2002/0033746 A1 * | 3/2002 | Kuwahara | H01F 7/06 | 335/229 |
| 2002/0084705 A1 * | 7/2002 | Kawamura | H02K 11/048 | 310/68 R |
| 2003/0189375 A1 * | 10/2003 | Raad | B60L 7/26 | 303/20 |
| 2003/0193250 A1 * | 10/2003 | Maslov | H02K 11/0094 | 310/68 R |
| 2003/0193264 A1 * | 10/2003 | Pyntikov | H02K 11/33 | 310/68 D |
| 2004/0026191 A1 * | 2/2004 | Kloft | H02K 9/19 | 188/161 |
| 2004/0155554 A1 * | 8/2004 | Morgante | H02K 16/02 | 310/266 |
| 2005/0269895 A1 * | 12/2005 | Innami | H02K 1/148 | 310/429 |
| 2006/0006749 A1 * | 1/2006 | Sasaki | H02K 11/33 | 310/68 R |
| 2006/0175923 A1 * | 8/2006 | Abou Akar | H02K 1/278 | 310/114 |
| 2007/0295568 A1 * | 12/2007 | Vasilescu | H02K 5/207 | 188/274 |
| 2008/0161189 A1 * | 7/2008 | Lewis | H02K 16/02 | 505/121 |
| 2008/0231131 A1 * | 9/2008 | Gabrys | H02K 3/47 | 310/195 |
| 2009/0219050 A1 * | 9/2009 | Dessirier | H02K 11/042 | 188/267 |
| 2009/0247354 A1 * | 10/2009 | Dessirier | B60L 7/28 | 477/23 |
| 2009/0301829 A1 * | 12/2009 | Newiadomy | H02K 49/043 | 188/267 |
| 2010/0187933 A1 * | 7/2010 | Yamamoto | H02K 1/2793 | 310/156.33 |
| 2012/0274164 A1 * | 11/2012 | Zrno | H02K 16/02 | 310/114 |
| 2013/0015026 A1 * | 1/2013 | Li | H02K 1/20 | 188/267 |
| 2013/0057091 A1 * | 3/2013 | Kim | H02K 21/222 | 310/46 |
| 2013/0234542 A1 * | 9/2013 | Li | H02K 7/20 | 310/105 |
| 2013/0306389 A1 * | 11/2013 | Penev | B60L 7/10 | 180/165 |
| 2015/0171694 A1 * | 6/2015 | Walsh | H02K 29/03 | 310/156.43 |
| 2016/0200302 A1 * | 7/2016 | Sannelius | B60T 10/02 | 188/291 |
| 2016/0218585 A1 * | 7/2016 | Tzeng | H02K 11/33 | |
| 2017/0005561 A1 * | 1/2017 | Imanishi | H02K 1/14 | |
| 2017/0339752 A1 * | 11/2017 | Yamaguchi | H05B 6/02 | |
| 2018/0351440 A1 * | 12/2018 | Gieras | H02K 1/2746 | |
| 2019/0366853 A1 * | 12/2019 | Qu | B60L 13/08 | |
| 2020/0007019 A1 * | 1/2020 | Bernicot | H02K 7/20 | |
| 2021/0234415 A1 * | 7/2021 | Taniguchi | H02K 1/187 | |

FOREIGN PATENT DOCUMENTS

| | | |
|---|---|---|
| CN | 104935131 A | 9/2015 |
| CN | 206948126 U | 1/2018 |
| EP | 0849868 A1 | 6/1998 |
| EP | 1014545 A2 | 6/2000 |
| FR | 2757705 A1 | 6/1998 |
| JP | 2002-095236 A | 3/2002 |

OTHER PUBLICATIONS

Office Action issued in Chinese Patent Application No. 201910549659.5 dated Dec. 2, 2020.

Office Action issued in Chinese Patent Application No. 201910549659.5 dated May 7, 2021.

Extended European Search Report issued in European Patent Application No. 19180205.7 dated Nov. 25, 2019.

* cited by examiner

ELECTROMAGNETIC RETARDER AND GENERATOR ASSEMBLY WITH ROTOR AND STATOR, AND VEHICLE COMPRISING SUCH AN ASSEMBLY

BACKGROUND OF THE INVENTION

Field of the Invention

The invention relates to an electromagnetic retarder using eddy currents and a generator assembly able to supply this retarder, and also a utility vehicle.

Electromagnetic retarders serve to reduce the rotational speed of a turning machine. Such retarders are generally used as supplemental or endurance braking devices in utility vehicles such as cars or trucks. Such retarders can also be used in aerial tramways or elevators.

Description of the Related Art

Document EP 1,014,545 discloses an assembly comprising an electromagnetic retarder and a generator able to supply this electromagnetic retarder. The assembly comprises a rotor secured to a transmission shaft and a stator through which the transmission shaft passes coaxially. The generator is able to generate an electric current from the rotary movement of the rotor relative to the stator. The stator comprises a cylindrical part secured to the housing of a transmission. The rotor is made up of two coaxial sleeves connected by a side plate. The cylindrical part of the stator is disposed between the two sleeves of the rotor and close thereto. The outer surface of the cylindrical part of the stator comprises an inductor suited for generating eddy currents in the outer sleeve of the rotor. This outer sleeve constitutes the armature of the retarder. The generator comprises an inductor arranged on the outer surface of the inner sleeve of the rotor and an armature arranged on the inner surface of the cylinder of the stator.

However, this assembly has operational difficulties.

In fact, the permanent magnets of the integrated generator can demagnetize because of the high temperatures of the stator. First, the stator is heated by radiation from the rotor during braking phases, and next by conduction of the heat produced by eddy currents in the inductor of the retarder and the armature of the generator. For example, the maximum temperature tolerated for neodymium magnets (called NdFeB type) is 180° C. When this temperature is exceeded, the yield of the generator drops off very quickly. Consequently, the performance of the "retarder" function also drops off because it depends directly on the yield of the generator.

SUMMARY OF THE INVENTION

The purpose of the present invention is to propose a more reliable retarder and generator assembly.

For this purpose, the object of the present invention is an electromagnetic retarder and generator assembly, said assembly comprising a rotor, a retarder armature carried by the rotor, a generator inductor carried by the rotor, a stator comprising a sleeve having one outer axial surface and one inner axial surface, a retarder inductor arranged on the outer axial surface of the stator and a generator armature arranged on the inner axial surface of the stator, with said stator extending around an axis of rotation, characterized in that the sleeve comprises several bodies of nonmagnetic material arranged between the inductor of the retarder and the armature of the generator.

According to specific embodiments, the assembly comprises one or more of the following characteristics:
  Said nonmagnetic bodies are arranged according to a circular annular shape coaxial with the axis of revolution and extending in a plane perpendicular to the axis of rotation;
  Each body of nonmagnetic material has a circular arc shape;
  The inductor of the retarder comprises magnetic poles projecting radially outward from the outer axial surface of the sleeve, and wherein each nonmagnetic body is aligned with a magnetic pole along a radial direction, said radial direction being perpendicular to the axis of revolution;
  Said nonmagnetic bodies comprise through openings extending along a direction parallel to the axis of rotation;
  The inductor of the generator comprises a magnet-carrier block and several permanent magnets arranged inside said magnet-carrier;
  Wherein a radial direction is a direction perpendicular to the axis of rotation and wherein said permanent magnets extend with their north-south axis arranged at an angle relative to the radial direction;
  the assembly comprises a ventilation device able to pulse air through through-hole openings;
  the assembly comprises a cooling circuit able to circulate a cooling liquid through the through holes;
  The rotor comprises:
    A cylindrical envelope having an inner axial surface arranged opposite the outer axial surface of the stator;
    A crown housed inside said cylindrical envelope, where said crown has an outer axial surface arranged next to the inner axial surface of the stator; where the armature of the retarder is arranged on an inner axial surface the rotor and where the inductor of the generator is carried by the outer axial surface of the crown.

An object of the invention is also a utility vehicle comprising a drive device, a rotary shaft driven in rotation around the axis thereof by said drive device and an electromagnetic retarder and generator assembly as described above.

BRIEF DESCRIPTION OF THE DRAWINGS

The invention will be better understood on reading the following description, given solely as an example and made with reference to the figures in which.

DESCRIPTION OF THE PREFERRED EMBODIMENTS

In the description which follows, the terms "right" and "left" are defined when the retarder generator assembly according to the invention is arranged as shown in the figures, and are in no way limiting.

Figure 1:
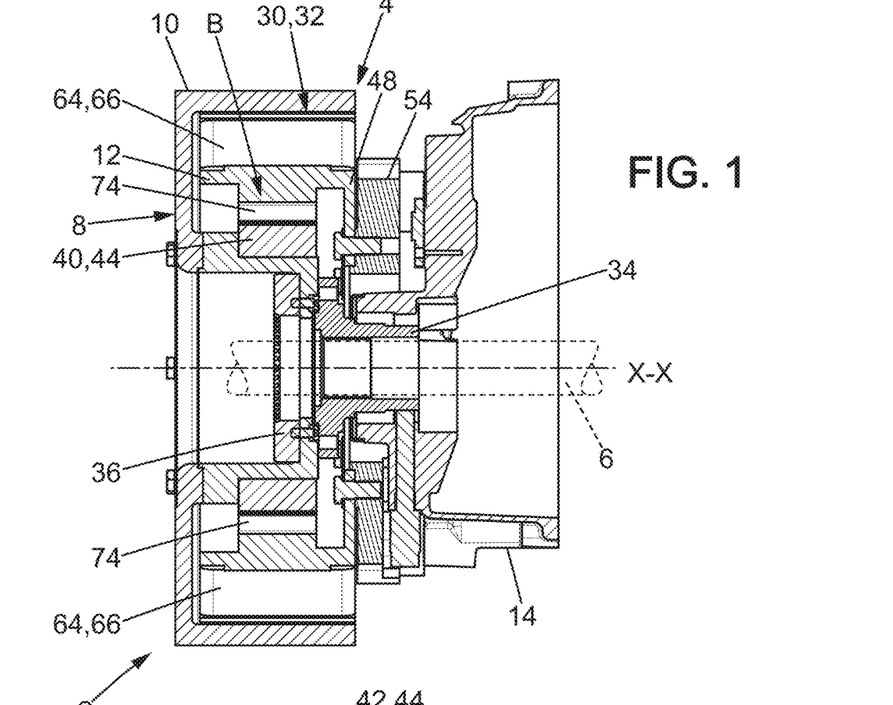
FIG. 1 is an axial section view of an assembly according to the present invention.
Figure 2:
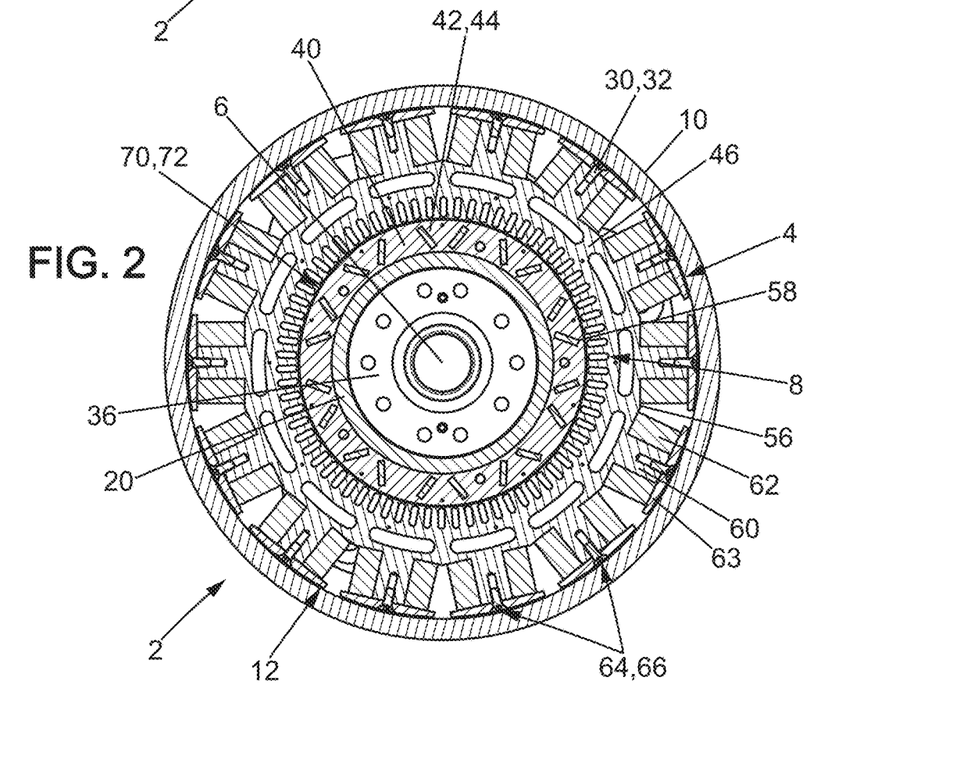
FIG. 2 is a radial section view of the assembly shown in FIG. 1.

With reference to FIGS. 1 and 2, the electromagnetic retarder and generator assembly 2 according to the present invention comprise an eddy current electromagnetic retarder 4 able to brake the rotation of the rotary shaft 6 and the generator 8 intended to electrically supply this electromagnetic retarder.

This assembly 2 can be mounted on the rotary shaft 6 leaving a drive device of a utility vehicle such as a car, van or truck or a motor of an elevator or an aerial tramway.

This assembly 2 comprises a rotor 10 able to turn in rotation with the rotary shaft 6 of the drive device and a stator 12 intended to be fixed to a housing 14 of the transmission or bridge of this drive device.

Figure 3:
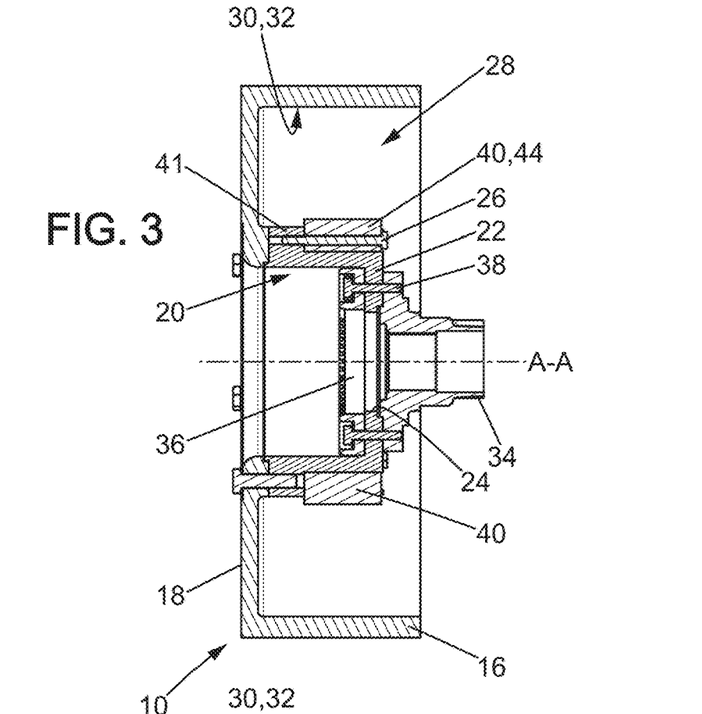
FIG. 3 is an axial section view of a rotor according to a first embodiment of the invention.

Referring to FIG. 3, the rotor 10 comprises a cylindrical envelope 16 provided at the left end thereof with a radial side plate 18 extending towards the inside and a crown 20 provided at the right end thereof with a radial rim 22 extending towards the inside and delimiting an opening 24.

The left end of the crown 20 is attached to the radial side plate 18 by screws 26 such that the crown 20 extends to the inside of the cylindrical envelope 16. The cylindrical envelope 16, the radial side plate 18 and the crown 20 form an annular housing 28 having an open radial surface towards the housing 14.

The cylindrical envelope 16 and the crown 20 are circular and have the same axis of rotation A-A. The opening 24 is also centered on this axis of rotation A-A. This axis of rotation A-A is coincident with the axis of rotation X-X of the rotary shaft 6 of the drive device when the retarder generator assembly 2 is mounted on the drive device.

The cylindrical envelope 16 comprises one inner axial surface 30 which constitutes the armature 32 of the retarder 4.

The rotor 10 further comprises a transmission flange 34 intended to bear the rotary shaft 6 of the drive device and an annular shaped spacer part 36 able to secure the rotor 10 to the rotary shaft 6 in rotation. For this purpose, the spacer part 36 is provided with grooves able to engage in the complementary grooves of the rotary shaft 6 so as to secure the rotor 10 to the rotary shaft 6.

The transmission flange 34 is attached against the right surface of the radial rim 22 and the spacer part 36 is fixed against the left surface of the radial rim 22 by screws 38.

Figure 4:
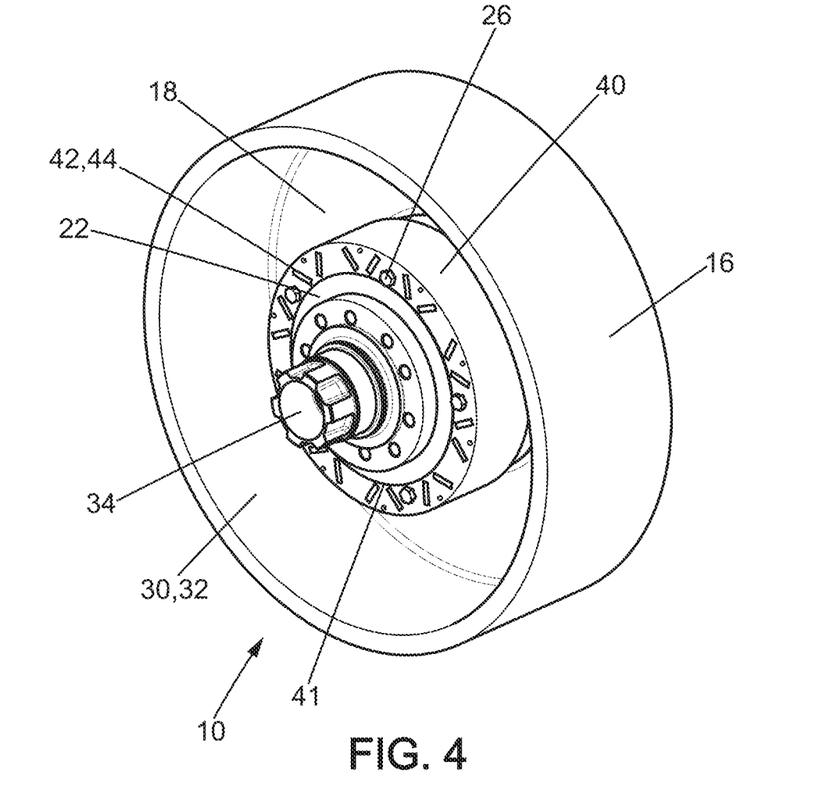
FIG. 4 is a perspective view of the rotor shown in FIG. 3.

With reference to FIG. 4, the rotor 10 further comprises a magnet-carrier block 40 attached, for example by screws 26, onto the outer axial surface 41 of the crown 20. This magnet-carrier block 40 comprises permanent magnets 42 buried inside the block. The magnet-carrier block 40 is made of laminated sheets, rolled sheets or sintered material. The permanent magnets 42 are positioned with their North-South axis at an angle relative to the radial direction. In particular, the permanent magnets 42 are arranged in pairs. Each pair of magnets is arranged in a V pattern open towards the cylindrical envelope 16.

As a variant, the pairs of permanent magnets 42 are arranged in a V pattern closed towards the cylindrical envelope 16.

According to another variant, the permanent magnets 42 are arranged flat on the outer axial surface 41 the crown 20.

These permanent magnets 42 constitute the inductor 44 of the generator 8.

Since these permanent magnets 42 are buried, they are less influenced by the magnetic field generated by the inductor of the retarder.

As a variant, the permanent magnets 42 are fixed directly onto the outer axial surface 41 of the crown 20, for example by adhering.

Figure 5:
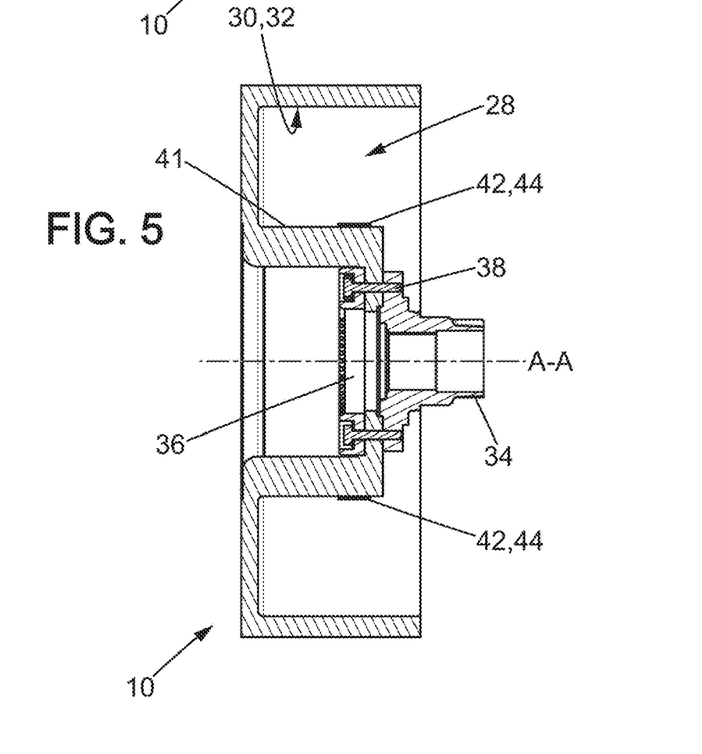
FIG. 5 is an axial section view of a rotor according to a second embodiment of the invention.

According to a variant shown in FIG. 5, the cylindrical envelope 16 and the crown 20 are formed from a single piece. In this embodiment, the permanent magnets 42 are attached directly onto the outer axial surface 41 of the crown.

Figure 6:
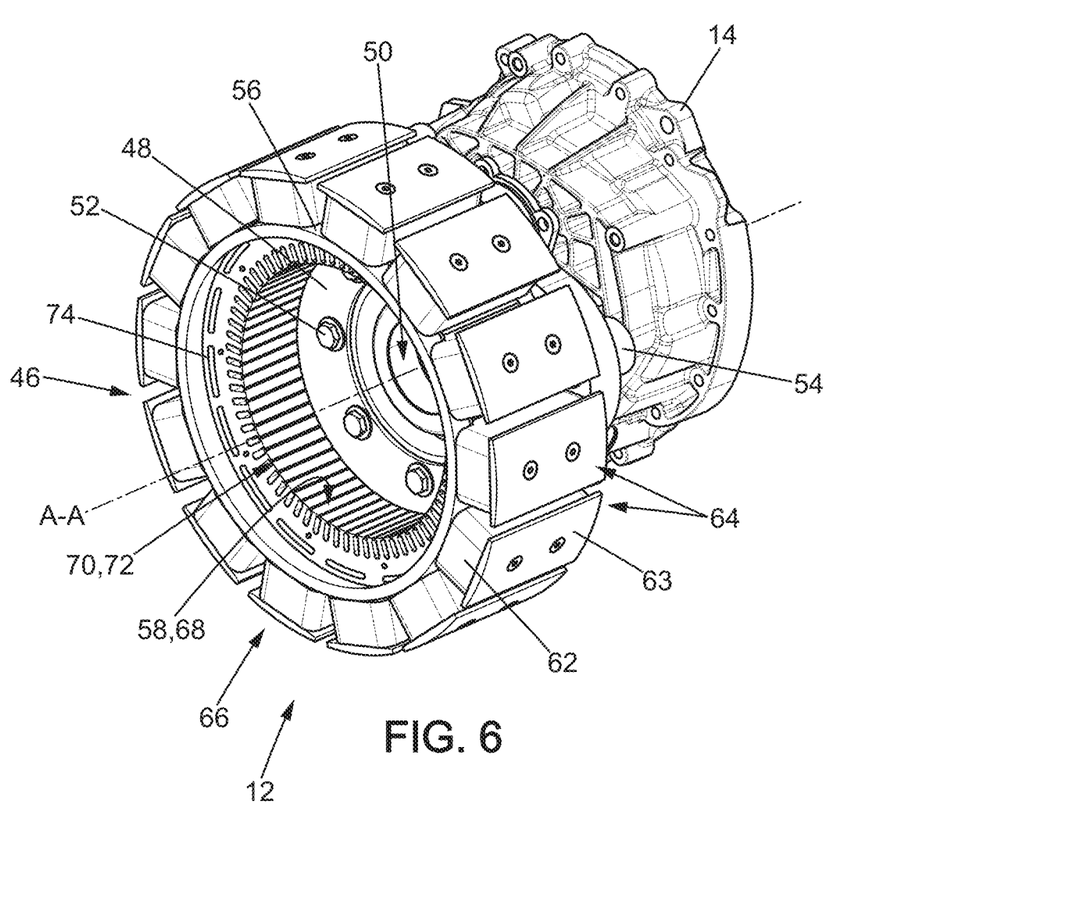
FIG. 6 is a perspective view of the stator from the assembly according to the invention and a part of a housing of a transmission or bridge.

Referring to FIGS. 1, 2 and 6, the stator 12 comprises a sleeve 46 with circular cross-section and a radial back 48 through which a central opening 50 passes.

When the assembly 2 is assembled, the sleeve 46 extends around the same axis of rotation A-A as the cylindrical envelope 16 and the crown 20.

The radial back 48 is attached to a stator support 54 by means of screws 52. The stator support 54 is itself attached to the housing 14 of the transmission or bridge, as can be seen in FIG. 1.

The sleeve 46 is laid out in the housing 28 formed by the cylindrical envelope 16 and the crown 20 of the rotor.

The sleeve 46 has an outer axial surface 56 arranged opposite the inner axial surface 30 of the cylindrical envelope and an inner axial surface 58 arranged opposite and close to the magnet-carrier block 40 of the stator.

The outer axial surface 56 has poles extending outward from the outer axial surface. These poles 60 are surrounded by conducting electrical wires 62. Magnetic flux spreaders 63 described in the patent FR 2,757,705 issued in the name of Telma are attached to the free ends of the radio projection 60 by screws. The radial projections 60, the respective windings 62 thereof and the spreaders 63 form multiple magnetic poles 64 with alternating polarity. The assembly of magnetic poles 64, arranged circularly, constitute the inductor 66 of the retarder.

The inner axial surface 58 is provided with radial slits 68 forming cores. These cores are surrounded with conducting electric wires not shown in the figures. These cores and their electric wire windings constitute multiple three-phase magnetic poles 70. The assembly of magnetic poles 70 forms the armature 72 of the generator.

Referring to FIGS. 2 and 6, the sleeve 46 comprises several bodies 74 of nonmagnetic material arranged between the outer axial surface 56 and the inner axial surface 58 of the sleeve.

In particular the bodies 74 of nonmagnetic material are located between the inductor 66 of the retarder and the armature 72 of the generator. The nonmagnetic bodies 74 are arranged in a circular annular shape coaxial with the axis of rotation A-A. The nonmagnetic bodies 74 extend in a radial plane (meaning in a plane perpendicular to the axis of rotation A-A).

These bodies 74 of nonmagnetic material form a magnetic barrier between the magnetic field lines generated between the armature 32 and the inductor 66 of the retarder and also the magnetic field lines generated between the armature 72 and inductor 44 of the generator.

According to the embodiment shown, the stator comprises a number of nonmagnetic bodies 74 equal to the number of magnetic poles 64 of the inductor 66 of the retarder and each nonmagnetic body 74 is aligned with a magnetic pole 66 along a radial direction.

According to the embodiment shown, each nonmagnetic body 74 has a circular arc shape.

Figure 7:
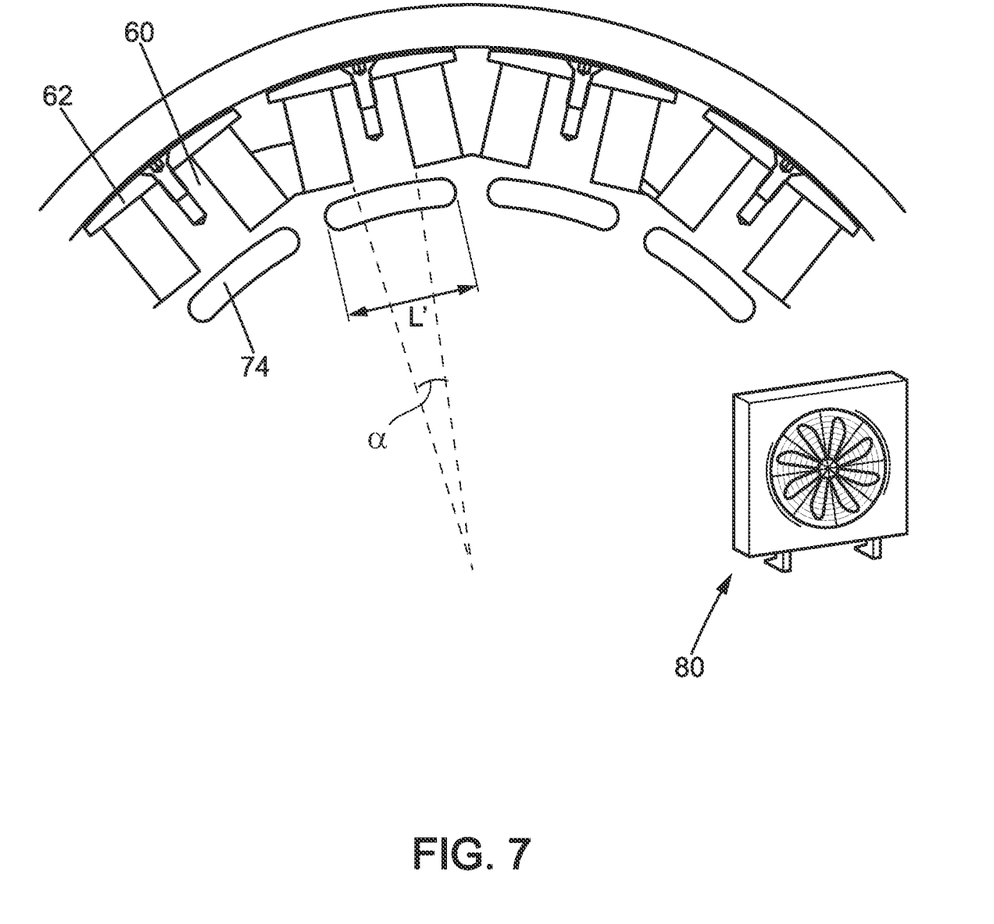
FIG. 7 is a front view of a part of the assembly shown in FIG. 1 and a cooling system.

Referring to FIG. 7, if it is considered that a pole 60 has a width L in a radial plane, the nonmagnetic body 74 can for example have a width L', with L' greater than 130% of the width L. Similarly, the height h of the nonmagnetic body can advantageously be included between L/4 and L/3. Preferably, the distance D between the nonmagnetic body 74 and the outer axial surface 56 of the sleeve is at least equal to L/2.

Similarly, if the pole extends over a circular arc of angle $\alpha$, the nonmagnetic body extends over a circular arc greater than 130% of $\alpha$.

The nonmagnetic bodies can comprise through holes or be entirely shaped by through holes. The through holes extend along the direction parallel to the axis of rotation A-A. Advantageously, these through holes simultaneously allow cooling of the stator. In particular, these through holes allow the cooling of the sleeve 46, poles 60, winding 62, magnetic poles 70 and the armature 72.

The electromagnetic retarder and generator assembly 2 can comprise a fan 80 able to accelerate the speed of the airflow. The stator is thus cooled by the forced airflow.

As a variant, the electromagnetic retarder and generator assembly 2 comprises a cooling circuit able to circulate a cooling liquid through the through holes. The cooling circuit comprises a pump and tubes containing a cooling liquid.

As a variant, the cooling can be done by a non-pulsed airflow.

As a variant, the nonmagnetic bodies are made of aluminum, rubber, nonmagnetic stainless steel, cast iron, magnesium, carbon fiber, sintered powder, etc. In this case, the stator is made of laminated sheets, rolled sheets or sintered material.

As a variant, the sleeve comprises a single nonmagnetic body forming a non-traversing circular groove coaxial to the axis of rotation A-A. This groove extends in a radial plane, meaning in a plane perpendicular to the axis of rotation A-A. This groove can be empty or filled with aluminum, rubber, etc.

In operation, the rotation of the rotor 10 relative to the stator 12 generates a current in the conducting electrical wires of the magnetic poles 70 of the armature of the generator. This current is rectified by a rectifier that is not shown. When the driver of the vehicle activates the electromagnetic retarder 4, the electricity coming from the rectifier supplies the coils 62 of the magnetic poles 64 of the inductor of the electromagnetic retarder 4. The magnetic fields created by the armature of the retarder generate eddy currents on the inner surface of the cylindrical envelope 16. These eddy currents serve to slow the rotor relative to the stator.

The invention also relates to a utility vehicle comprising a drive device, a rotary shaft 6 driven in rotation around the axis thereof by said drive device and an electromagnetic retarder and a generator assembly 2 as described above.

The invention claimed is:

1. An assembly of an electromagnetic retarder and a generator, said assembly comprising:
   a rotor;
   an armature of the retarder carried by the rotor;
   an inductor of the generator carried by the rotor;
   a stator comprising a sleeve having one outer axial surface and one inner axial surface, the stator extending around an axis of rotation;
   an inductor of the retarder arranged on the outer axial surface of the stator; and
   an armature of the generator arranged on the inner axial surface of the stator,
   wherein the sleeve comprises a plurality of bodies of nonmagnetic material arranged between the inductor of the retarder and the armature of the generator,
   wherein the inductor of the retarder comprises poles having a width L in a radial plane, and
   wherein each of the nonmagnetic bodies has a width L', the width of the nonmagnetic bodies L' being greater than 130% of the width L of the poles.

2. The assembly according to claim 1, wherein the rotor comprises:
   a cylindrical envelope having an inner axial surface disposed opposite the outer axial surface of the stator, and
   a crown housed inside said cylindrical envelope, said crown having an outer axial surface disposed next to the inner axial surface of the stator, where the armature of the retarder is disposed on an inner axial surface of the rotor and where the generator inductor is carried by the outer axial surface of the crown.

3. A utility vehicle comprising:
   a drive device;
   a rotary shaft driven in rotation around the axis thereof by said drive device; and
   the electromagnetic retarder and generator assembly according to claim 1.

4. The assembly according to claim 1, wherein the height of the nonmagnetic bodies includes between L/4 and L/3.

5. The assembly according to claim 1, wherein the distance between the nonmagnetic bodies and the outer axial surface of the sleeve is at least equal to L/2.

6. The assembly according to claim 1, wherein the inductor of the retarder comprises poles, each of the poles extending over a circular arc of angle $\alpha$, each of the nonmagnetic bodies extending over a circular arc greater than 130% of $\alpha$.

7. The assembly according to claim 1, wherein the inductor of the generator comprises a magnet-carrier block and a plurality of permanent magnets disposed inside said magnet-carrier block.

8. The assembly according to claim 7, wherein a radial direction is a direction perpendicular to the axis of rotation, and
   wherein said permanent magnets extend with the north-south axis thereof disposed at an angle relative to the radial direction.

9. The assembly according to claim 1, wherein the inductor of the retarder comprises magnetic poles projecting radially outward from the outer axial surface of the sleeve, and
   wherein each of the nonmagnetic bodies is aligned with a magnetic pole along a radial direction that is perpendicular to the axis of rotation.

10. The assembly according to claim 9, wherein said nonmagnetic bodies comprise through-hole openings extending along a direction parallel to the axis of rotation.

11. The assembly according to claim 9, wherein the generator inductor comprises a magnet-carrier block and a plurality of permanent magnets arranged inside said magnet-carrier block.

12. The assembly according to claim 1, wherein said nonmagnetic bodies comprise through-hole openings extending along a direction parallel to the axis of rotation.

13. The assembly according to claim 12, further comprising a ventilation device configured to pulse air through the through-hole openings.

14. The assembly according to claim 12, further comprising a cooling circuit configured to circulate a cooling liquid through the through-hole openings.

15. The assembly according to claim 1, wherein each of the nonmagnetic bodies of nonmagnetic material has a circular arc shape.

16. The assembly according to claim 15, wherein the retarder inductor comprises magnetic poles projecting radially outward from the outer axial surface of the sleeve, and
wherein each of the nonmagnetic bodies is aligned with a magnetic pole along a radial direction that is perpendicular to the axis of rotation.

17. The assembly according to claim 15, wherein said nonmagnetic bodies comprise through-hole openings extending along a direction parallel to the axis of rotation.

18. The assembly according to claim 15, wherein the generator inductor comprises a magnet-carrier block and a plurality of permanent magnets arranged inside said magnet-carrier block.

19. The assembly according to claim 1, wherein said nonmagnetic bodies are disposed according to a circular annular shape coaxial with the axis of rotation and extending in a plane perpendicular to the axis of rotation.

20. The assembly according to claim 19, wherein each of the nonmagnetic bodies of nonmagnetic material has a circular arc shape.

21. The assembly according to claim 19, wherein the retarder inductor comprises magnetic poles projecting radially outward from the outer axial surface of the sleeve, and
wherein each of the nonmagnetic bodies is aligned with a magnetic pole along a radial direction that is perpendicular to the axis of rotation.

22. The assembly according to claim 19, wherein said nonmagnetic bodies comprise through-hole openings extending along a direction parallel to the axis of rotation.

23. The assembly according to claim 19, wherein the generator inductor comprises a magnet-carrier block and a plurality of permanent magnets arranged inside said magnet-carrier block.

24. An assembly of an electromagnetic retarder and a generator, the assembly comprising:
a rotor;
an armature of the retarder carried by the rotor;
an inductor of the generator carried by the rotor;
a stator comprising a sleeve having one outer axial surface and one inner axial surface, the stator extending around an axis of rotation;
an inductor of the retarder arranged on the outer axial surface of the stator; and
an armature of the generator arranged on the inner axial surface of the stator,
wherein the sleeve comprises a plurality of bodies of nonmagnetic material arranged between the outer axial surface of the sleeve and the inner axial surface of the sleeve,
wherein the inductor of the retarder comprises poles having a width L in a radial plane, and
wherein each of the nonmagnetic bodies has a width L', the width of the nonmagnetic bodies L' being greater than 130% of the width L of the poles.

* * * * *